(No Model.)
W. M. BROWN, Jr.
PIPE COUPLING.
No. 407,922.  Patented July 30, 1889.
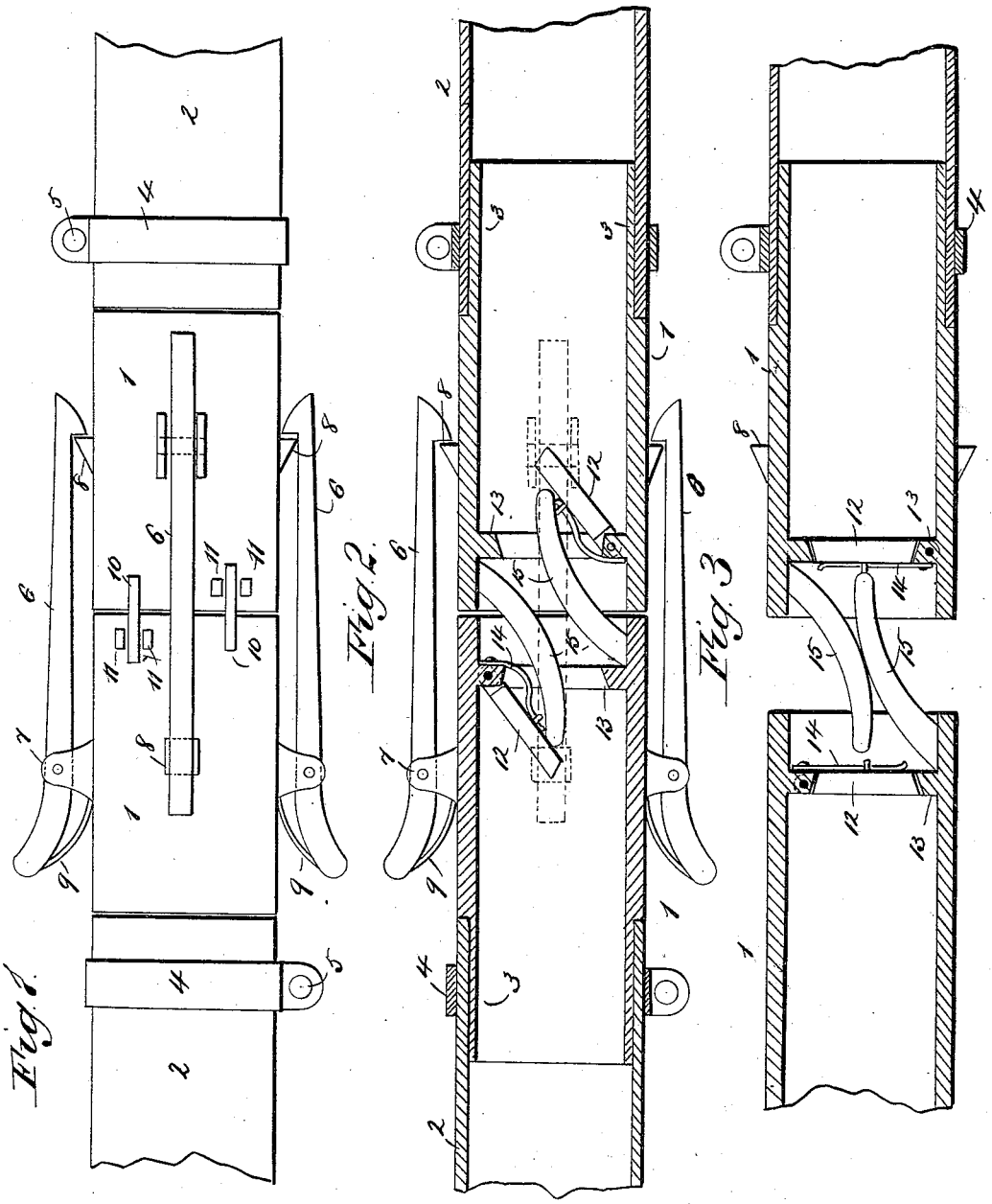
WITNESSES:
F. McArdle,
C. Sedgwick
INVENTOR
W. M. Brown Jr
BY
Munn & Co.
ATTORNEY

UNITED STATES PATENT OFFICE.

WILLIAM MAINLAND BROWN, JR., OF SACRAMENTO, CALIFORNIA.

PIPE-COUPLING.

SPECIFICATION forming part of Letters Patent No. 407,922, dated July 30, 1889.

Application filed April 19, 1889. Serial No. 307,640. (No model.)

*To all whom it may concern:*

Be it known that I, WILLIAM MAINLAND BROWN, Jr., of Sacramento, in the county of Sacramento and State of California, have invented a new and Improved Steam-Pipe Coupling for Railway Passenger-Cars, of which the following is a full, clear, and exact description.

This invention relates to couplings for connecting the main steam-supply pipes of railway passenger-cars, and has for its object to provide a coupling which may be automatically coupled and readily uncoupled, and will be effective in use.

The invention consists in a steam-pipe coupling, constructed and arranged as hereinafter described and claimed.

Reference is to be had to the accompanying drawings, forming a part of this specification, in which similar figures of reference indicate corresponding parts in all the views.

Figure 1 illustrates a steam-pipe coupling constructed in accordance with this invention. Fig. 2 is a horizontal longitudinal section illustrating the interior of the coupling; and Fig. 3 is a longitudinal section of the coupling with parts removed, and showing the coupling unfastened.

This invention has especial reference to connecting the main steam-supply pipes of railway passenger-cars; and it consists in a steam-pipe coupling formed with the hollow sections 1, secured to the main steam-supply pipes 2 in any suitable manner, and, as here shown, by means of the shouldered end 3, projecting into the main pipe 2, and held by the ring-clamps 4, having their ends riveted together, as at 5.

Each hollow section 1 is provided with hooked arms 6, pivoted adjacent to their rear ends in lugs 7, and of a length to project beyond the end of hollow section 1 and extend over the joint formed by the connecting ends of the sections 1 when the latter are brought together. Each hollow section is also provided with inclined lugs 8, in line with a hooked arm 6, on the opposite or meeting section 1, and located at such a distance from the end of each section 1 that when the ends of the sections 1 abut the hooked end of arms 6 will engage the lugs 8 and couple the sections 1 together.

Beneath the rear end of arms 6 is located a spring 9, which serves to hold the hooked end of arm 6 in engagement with its lug 8. As the sections 1 are brought together end to end, the outer end of the projecting hooked arms 6 will ride over the inclined lugs 8, the spring 9 yielding to the movement of arm 6, and when the ends of sections 1 abut the springs 9 act to throw the hooked ends of arms 6 into engagement with lugs 8. Each section 1 is preferably provided with two of the coupling hooked arms 6, arranged to extend alternately in opposite directions to each other, thereby forming an interlocking coupling-connection. The sections 1 are held from lateral movement at their ends, so as to keep the hooked ends of arms 6 from being moved laterally out of engagement with lugs 8 by means of arms 10, projecting lengthwise from the ends of sections 1 in opposite directions and extending between lugs 11 on the opposite section. There will be as many projecting arms 10 alternating and overlapping the opposite abutting-section as there are hooked coupling-arms 6. Within the hollow sections 1 are located inwardly-opening valves 12, closing against the valve-seats 13 and drawn into and held in closed position by means of a spring 14, connected to the valve-seat 13 and the valve 12.

In the end of hollow sections 1, outside of valve-seat 13, is mounted a curved arm 15, projecting forward of the section 1, and so arranged that when the ends of sections 1 are brought together the arms 15 will pass each other and bear against and open the valves 12 as the sections 1 are coupled together. When the sections 1 are uncoupled and drawn apart, the valves 12 will be closed automatically by the springs 14. It will thus be seen that by means of this invention a pipe-coupling is provided, which will be automatically coupled and may be readily uncoupled.

Having thus described my invention, what I claim as new, and desire to secure by Letters Patent, is—

1. A steam-pipe coupling for connecting the main supply-pipes of passenger-cars, consisting of hollow sections having spring-actuated coupling-hooks pivoted to and projecting beyond the ends of the hollow sections, guide-bars and engaging-lugs, and spring-actuated inwardly-opening valves, and arms projecting from the open ends of the hollow sections to bear against and hold the valves open when the coupling is closed, substantially as shown and described.

2. In a steam-pipe coupling, hollow sections having spring-actuated coupling-hooks projecting beyond the ends of the hollow sections, inclined lugs on the sections with which the coupling-hooks automatically engage, inwardly-opening valves in the hollow sections, with springs for holding the valves in closed position, and arms projecting out of the ends of the hollow sections to bear against and hold the valves open when the hollow sections are coupled together, substantially as shown and described.

3. In a steam-pipe coupling as herein described, a hollow section 1, containing an inwardly-opening valve 12, with a closing-spring 14, a curved arm 15, projecting forward out of the end of hollow sections 1, hooked lever-coupling arms 6, projecting forward of the hollow section 1 and having an actuating-spring 9 located beneath their rear end, inclined lugs 8, guide-arms 10, projecting beyond the end of the hollow section, and sets of guide-lugs 11, located at the end of the hollow section, substantially as shown and described.

WM. MAINLAND BROWN, JR.

Witnesses:
J. CALLAGHAN,
WM. M. BROWN, Sr.